(12) United States Patent
Phillips et al.

(10) Patent No.: US 6,728,352 B1
(45) Date of Patent: Apr. 27, 2004

(54) SWITCH INTERACTION SUBSYSTEMS FOR FACILITATING NETWORK INFORMATION MANAGEMENT

(75) Inventors: David R. Phillips, Birmingham, AL (US); Prakash K. Muthukrishnan, Birmingham, AL (US); Marc A. Guthrie, Birmingham, AL (US); Tim M. Blackmon, Alabaster, AL (US); Rebecca J. Soble, Birmingham, AL (US); Glenn E. Grabbe, Pelham, AL (US); Scott M. Sirdevan, Birmingham, AL (US)

(73) Assignee: Bear Creek Technologies, Inc., Birmingham, AL (US)

( * ) Notice: Subject to any disclaimer, the term of this patent is extended or adjusted under 35 U.S.C. 154(b) by 0 days.

(21) Appl. No.: 09/019,827

(22) Filed: Feb. 6, 1998

(51) Int. Cl.[7] ............................................. H04M 15/00
(52) U.S. Cl. ..................................... 379/113; 379/133
(58) Field of Search ........................... 379/34, 112, 113, 379/133, 134, 137, 209

(56) References Cited

U.S. PATENT DOCUMENTS

| | | | | |
|---|---|---|---|---|
| 5,335,268 A | * | 8/1994 | Kelly, Jr. et al. | 379/112 |
| 5,713,075 A | * | 1/1998 | Threadgill et al. | 455/427 |
| 5,737,399 A | * | 4/1998 | Witzman et al. | 379/112 |
| 5,999,604 A | * | 12/1999 | Walter | 379/133 |
| 6,011,838 A | * | 1/2000 | Cox | 379/113 |
| 6,078,647 A | * | 6/2000 | D'Eletto | 379/34 |
| 6,078,651 A | * | 6/2000 | Den Hartog | 379/113 |
| 6,084,955 A | * | 7/2000 | Key et al. | 379/133 |

* cited by examiner

*Primary Examiner*—Curtis Kuntz
*Assistant Examiner*—Rexford Barnie
(74) *Attorney, Agent, or Firm*—Palmer & Dodge, LLP; Anthony L. Miele

(57) ABSTRACT

A network information management system includes, among other elements, a traffic reporting system, a switch shell, and a scheduling mechanism. The traffic reporting includes a database which holds traffic-related data collected from a network switch. The switch shell facilitates communication between the traffic reporting system and multiple digital telecommunications switch types. More specifically, the switch shell translates between a high layer generic interface protocol which defines a common set of switch interaction functions to unique portions of code uniquely compatible with the various switch types. The high layer generic interface protocol may comprise a set of query and response subsets, including a query and response subset for submitting an inventory request and for receiving in response to the submitted request, inventory information from the switch. The inventory information may include such information as a unique identifier of a network resource, a number of members provided as part of the network resource and information concerning the assignment of the network resource. The scheduling mechanism coordinates switch interactions between the traffic reporting system and the switch shell.

10 Claims, 13 Drawing Sheets

SWITCH INTERACTION SUBSYSTEMS FOR FACILITATING NETWORK INFORMATION MANAGEMENT

BACKGROUND OF THE INVENTION

1. Reservation of Copyright

The disclosure of this patent document contains material which is subject to copyright protection. The copyright owner has no objection to the facsimile reproduction by anyone of the patent document or patent disclosure as it appear in the publicly available U.S. Patent and Trademark Office patent files or records, but otherwise reserves all copyright rights whatsoever.

2. Field of the Invention

The present invention relates to systems and methods for monitoring the use and performance of telecommunications network resources. In another aspect, the present invention is related to subsystems interacting with digital and analog telecommunications switches to provide information useful for managing the capacity of telecommunications network resources.

3. Description of Background Information

Communications networks facilitate communication between various devices. Two major categories of communications networks generally include broadcast networks and switching networks. A switching network may have a number of switching nodes interconnecting various types of transmission links. Such transmission links may traverse various physical distances, serving as, for example, PBX lines, long-distance lines, local exchange carrier lines, foreign exchange lines, 800-WATS lines, and/or tie lines. The physical connection may be made with the use of a cable, e.g., twisted copper pair, fiber-optic cabling, two-wire open lines, or coaxial cable, or it may be wireless, e.g., using cellular technologies, satellite transmission systems, terrestrial microwave links, or radio links. One or more combinations of existing networking technologies may be used to transmit signals over transmission lines, such as T1, PCM-30, SONET, ISDN, frame relay, asynchronous transfer mode (ATM), DMS (Digital Multiplex System), EWSD, and PBX.

Some popular switches include Nortel's DMS 100, Lucent's 5ESS, Siemens' EWSD, Lucent's 1AESS, and Nortel's Meridan PBX switches. These switches may be used to form circuit-switched networks, packet-switched networks, or hybrid combinations of the same. Switching technologies such as frame relay, ATM (asynchronous transfer mode), ISDN and broadband ISDN may all be accommodated by these switch types as well.

Many different network information management (NIM) systems collect traffic-related data concerning the capacity, use and performance of the various links, link components, switches, switch components, and other network resources forming a given network.

Some such NIM systems perform measurements on network resources (e.g., trunk groups, switching modules, line units, and so on) to obtain traffic-related data (e.g., peg count, overflow/blockage and usage information) associated with each such network resource.

Generally, NIM systems obtain information concerning congestion and its causes so that system administrators or users may assess whether certain network resources or groups of network resources are over-dimensioned, under-dimensioned, and/or improperly arranged or provisioned. Traffic-related data concerning actual use and performance of network resources can be provided, and forecast data can be extrapolated therefrom, to supply the data necessary to provide new network resources and/or to reconfigure or extend existing network resources.

Some conventional systems include the Lucent EADAS data collector and certain downstream operational support systems (e.g., NTMOS) which use data collected by the EADAS data collector to carry out certain operations system support functions.

Yet other NIM systems capture traffic-related data concerning network resources (e.g., trunks) between switches. One such system is described at Applied Digital Access's Web Site (ADA's) (www.ada.com). The system is called the Traffic Data Collection and Engineering operations system (TDC&E). It is described as a service assurance package for switched networks which supports all major traffic engineering functions, including equipment servicing, trunk forecasting, load balancing, toll separations, marketing studies, and service level exceptions.

According to their Web Site (www.hekimian.com), Hekimian Laboratories, Inc. provides a PM (performance monitor) Integrator System which collects and analyzes PM data from network elements (NEs)throughout the network. Users can request lists, graphs, and reports to check the state of the network. Technicians may review these presentations on a daily basis to determine if the service quality level of a circuit is satisfactory, and can look for trends to see if a circuit's performance is declining over time or experiencing intermittent errors.

Objective System Integrators in its web site (www.osi.com) describes a product called traffic-MASTER™. The product is said to be a fully automated, real-time traffic management and traffic management data collection and reporting tool that addresses the information needs related to switch performance and network traffic. The stated benefits of using traffic-MASTER™ include increased call completions, immediate response to network failures, and preservation of greater service levels during network failures and high-traffic situations.

Bear Creek Technologies has a family of network information management products.

The TrafficWise® NIM products directly interact with individual switches to initiate traffic engineering studies, analyze the produced data, and automatically produce traffic-related reports. Other systems have required manual operations and complex training to administer and configure multiple switches in order to perform traffic studies. Each study would take on the order of six to nine weeks to order, receive and view traffic engineering and customer service studies. Such studies were manually submitted, and members of the network operation staff would spend many hours checking for errors before initiating the study at the switch. This required the manual tracking of switch registers assigned to gather traffic-related data. In some cases, studies would be stopped early or left up too long, leaving switch registers unavailable for additional studies.

FIG. 1 provides a high level block diagram of the TrafficWise® Regional Reporting System, Version 3.0.

The illustrated system 10 comprises, among other elements, a user work station 12 connected in tandem to a web server 14 and a switch server 16. A plurality of switches 18a–18c are each coupled to switch server 16 via a switch network (not shown). The switch network may comprise, e.g., an Ethernet network, or a DataKit type connection. Client software is provided on the user work station 12, and intranet web server software is provided on web server 14.

Software residing on switch server 16 enables traffic data to flow from each such switch to switch server 16 and web server 14.

Switch server 16 will establish communication with the appropriate switch based upon a CLLI (Common Language Location Identifier—a switch identifying value) specified by the user at user work station 12 and provided to switch server 16 via web server 14.

The user will interface with the system via user work station 12 and click a "new order" button in a tool bar. The user will then specify information regarding the study to be requested including a switch identifier (switch CLLI), the facility type, the OM group, period of time over which the study will be performed, the traffic study model (e.g., Poisson or Erlang C), and the facility name.

Once the data is entered, the system will verify that the switch CLLI is valid and that the OM group name is in the correct format. Once a new study is successfully entered and saved, it will appear in a studies field. Once all of the customer data and the studies are entered to the satisfaction of the system user, a submit button may be triggered which will send the order to web server 14. Web server 14 then instructs switch server 16 to communicate with the appropriate switch based upon the input CLLI value. Switch server 16 will communicate with the appropriate switch at predetermined intervals and query the switch to verify whether the designated facility can be studied. If the study cannot be verified, an alert icon will appear on the studies list screen.

At a predetermined time (configurable by the system administrator), switch server 16 will attempt to set up the study on the switch enabling the traffic data to flow from the selected switch 18i (18a, 18b, or 18c) to switch server 16. If a study cannot be set up, that study is cancelled. The reason why the study was not set up and the appropriate corrective action will then be available for retrieval by the user at user work station 12.

After the study has ended, switch server 16 will again interact with the appropriate switch 18i to turn off the flow of data from switch 18i to server 16, thereby freeing the switches resources.

FIG. 2 illustrates at a high level the switch interaction functions performed by the system illustrated in FIG. 1. In step S2, a studies list is modified at user work station 12 when a new study is scheduled by the user. In step S4, the study is scheduled in accordance with a time specified by the user to commence the study. A setup_lead_time variable is used to determine the time at which switch server 16 will start trying to set up the study. More specifically the study start time specified by the user less the setup_lead_time is the time at which switch server 16 will start trying to set up the study. The setup_lead_time value is a time set during the initialization of switch server 16, and can be changed.

Should the user specify that a study is to start on Aug. 1, 1997, the system will start a predetermined amount of time before that date, e.g., on Jul. 30, 1997, if the setup_lead_time is equal to two days, and start the output of OM measurements in advance.

At step S6, the process will connect to the switch and proceed to step S8. At step S8, a presently scheduled switch interaction of a particular type (i.e., verify, setup, takedown, or cancel) scheduled together for the designated switch will be performed. After performing the a scheduled switch interaction at step S8, the switch server 16 proceeds to step S12, and determines whether another switch interaction of the same type is scheduled. If not, the process proceeds to step S14 where switch server 16 is disconnected from the switch. If the answer at step S12 is yes, switch server 16 does not disconnect from the switch as indicated at step S16 and returns to step S8.

The software executed on switch server 16 includes, among other things, a parallel verify manager and a parallel setup manager. Each of these programs communicate with switch interaction code in a mutually dependent fashion in order to perform any needed switch interaction functions. The parallel verify manger and the parallel setup manager are each state-driven. They each pull items related to study requests. The traffic-reporting system initiates switch interaction items by specifying a particular state. Some of the various states include: created, verified, configured, processing, complete, cancelled, and a plurality of report statuses (cancelled sent, cancelled sending, complete sent). By way of example, the parallel verify manager pulls all items of a particular state into memory and performs switch interactions corresponding to those items accordingly.

This structure was disadvantageous for a number of reasons, including limitations regarding scalability. As more studies were added, more items would be pulled into memory by the parallel verify manager or the parallel setup manager. In addition, it was sometimes necessary to connect to the same switch at least four separate times to complete a given set of work for that switch.

Improved network information management systems are needed which interact with the switch in an automated fashion to provide accurate, up-to-date information concerning network resources. Improved switch interaction processes are needed to minimize the interference with switch resources during such switch interaction. In addition, there is a need for switch interaction processes compatible with multiple switch types that are easy to maintain as well as extensible.

There is also a need for a NIM that interacts with the switch to automatically setup special studies concerning network resources on a lower, i.e., more-detailed, level. For example, traffic information may be desired concerning detailed line concentrators (e.g., half line grids or line group concentrators). In such instances, a special study will need to be set up on a switch, which will require sophisticated switch interaction processes.

4. Definitions Of Terms

The following term definitions are provided to assist in conveying an understanding of the various exemplary embodiments and features disclosed herein.

Traffic-Related Data

Traffic data and/or traffic management data.

Traffic Data

Usage, peg count, overflow, blockage and other performance, usage, and/or capacity information concerning a large set of network resources, e.g., trunk groups, multi-line hunt groups, virtual facilities groups, simulated facilities groups, subscriber lines and so on.

Traffic Management Data

Usage, peg count, overflow, blockage, and other information concerning a smaller set of network resources, e.g., interoffice trunk groups.

Multiline Hunt Group

A logical group of lines (e.g., modem pool, sales operator pool, etc.). An incoming call will search for an idle line within the specified group of lines.

Network Resources (Facilities)

Network resources may comprise physical network resources or virtual network resources.

Virtual Network Resources

Such resources include services such as three-way calling, call-forwarding, and distinctive ringing. Measurements concerning virtual network resources may comprise such values as the number of calls accessing the service, and the number of service failures.

Physical Network Resources

These may comprise switch components or other physical network components. Some examples includes concentrators, common control equipment, transmission components, processors, and memory devices (e.g., buffers). Measurements concerning physical network resources may include such values as peg count, overflow, blockage, usage, and the number of members corresponding to each such network resource (this is a value concerning the capacity or size of the resource).

Inventory (Reference Data)

The capacity and configuration of a particular network resource (virtual or physical). Some information concerning the capacity and/or configuration of a physical network resource may include the number of members associated with that resource (e.g., the number of subscriber lines at the output of a line concentrator), whether the network resource is physically provided in the network, whether the network resource is hardware assigned (connected to something), and whether the resource is software assigned (given a number, e.g., in a particular service).

SUMMARY OF THE INVENTION

The present invention is provided to improve upon network information management systems and methods. In order to achieve this end, one or more aspects of the invention may be followed to bring about one or more specific objects and advantages, such as those noted below.

One object of the present invention is to provide an improved switch interaction subsystem and method for facilitating the automatic setup and takedown of traffic studies associated with one or more network switches, and to further facilitate other configuration and information-gathering functions associated with such switches.

Another object of the present invention is to provide a network information management system and switch interaction subsystem associated therewith which facilitate the automatic setting up of special studies (i.e., where one or more switches may have to be configured to accumulate OMs) and the acquisition of data in a database from the associated switch in accordance with such special studies.

A further object of the present invention is to provide an improved network capacity management system which allows inventory data to be acquired directly from the switch (or indirectly via a data collector) in an automated manner. Such information can be used to provide a picture of the overall network capacity and configuration, and may be used to facilitate traffic-related data measurement functions performed by NIMs.

Other features may be provided to achieve additional objects and advantages. For example, a switch interaction subsystem may be provided to accommodate multiple switch types and to allow a network information management system to interact with different switch types to setup and takedown studies and to obtain information from the switch in an automated fashion. The present invention, therefore, is directed to a method or system for performing network information management functions. The present invention may also be directed to one or more subcomponents of such a method or system.

In accordance with one aspect of the invention, a network information management system has, among other elements, a traffic reporting system, a switch shell, and a scheduling mechanism. The traffic reporting system includes a database holding traffic-related data collected from a digital telecommunications network switch. The switch shell comprises a multi-layer subsystem, including a higher layer, a middle layer, and a lower layer. The higher layer comprises a generic interface protocol defining common switch interaction functions with a set of query and response subsets. The common switch interaction functions are common among multiple switch types. The middle layer comprises respective code portions uniquely compatible with the corresponding multiple switch types. The lower layer interfaces the switch shell with a local area network linking plural digital telecommunications switches. The scheduling mechanism schedules the interactions between the traffic reporting system and the switch shell.

The query and response subsets may comprise a query and response subset for submitting an inventory request to the switch and for receiving, in response to the submitted inventory request, inventory information from the switch. The inventory information may comprise a unique identifier of a network resource, and a number of members provided as part of the network resource. The inventory information may further include information indicating whether each member of the network resource is at least one of hardware assigned and software assigned.

The multiple switch types may comprise 5ESS and DMS 100 switches. The network resource may comprise a concentrator comprising first and second sides, where a first number of channels is provided at the first side and a second larger number of lines is provided at the second side. The concentrator may also comprise a line concentrating module of a DMS 100 switch, or a concentrator of a 5ESS switch, receiving 64 channels at the first side and receiving up to 640 lines at the second side.

A query and response subset may be provided for submitting a setup request to the switch to setup one or more particular traffic studies. The setting up of a particular study may comprise assigning a set of registers within the switch to accumulate data concerning network resources associated with the switch. The switch accumulates, in the assigned set of registers, operational measurements (OMs) and associated inventory information. The associated inventory information may include one or more of a unique identifier of a network resource, a number of members provided as part of the network resource, and information indicating whether each member of the network resource is at least one of hardware assigned and software assigned.

In this regard, the network information management system may further comprise an OM retrieval process for retrieving the accumulated OMs from the assigned set of registers. A facility update process may be provided for updating facility files comprising inventory information pertaining to the network resource. In addition, a facility loader may be provided which uses network inventory information in the facility files to modify network resource information held by the database.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout several views, and wherein.

DETAILED DESCRIPTION OF THE EXEMPLARY EMBODIMENTS

Figure 1:
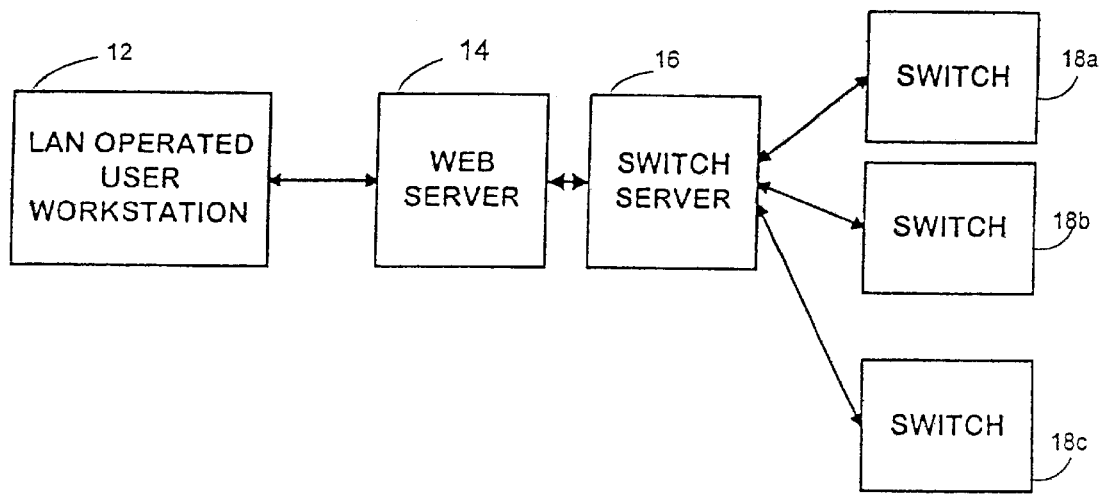
FIG. 1 illustrates a high-level block diagram of a TrafficWise® Regional Reporting System, Version 3.0.
Figure 2:
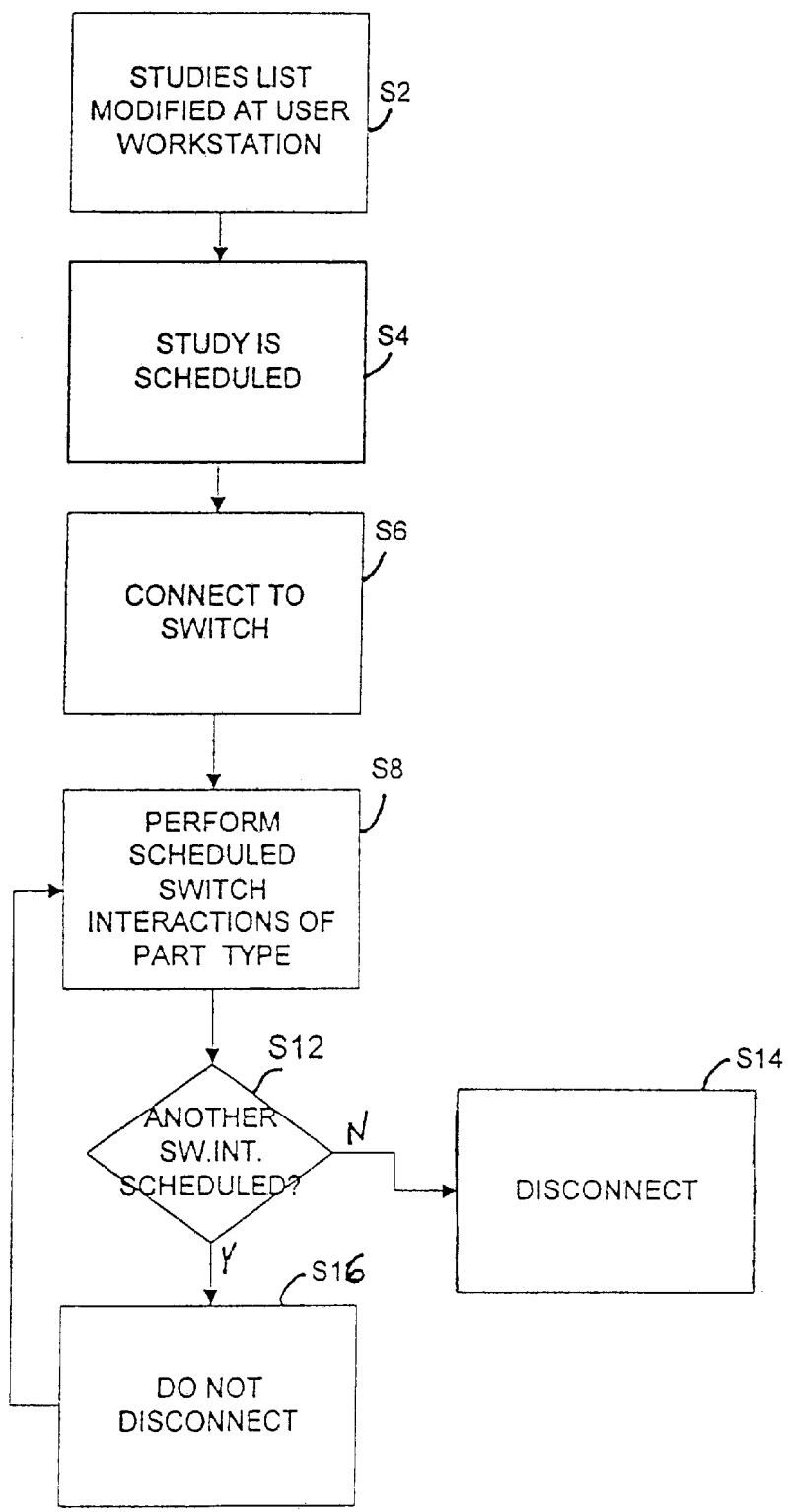
FIG. 2 provides a high-level flow chart of switch interaction functions performed by the system illustrated in FIG. 1.
Figure 3:
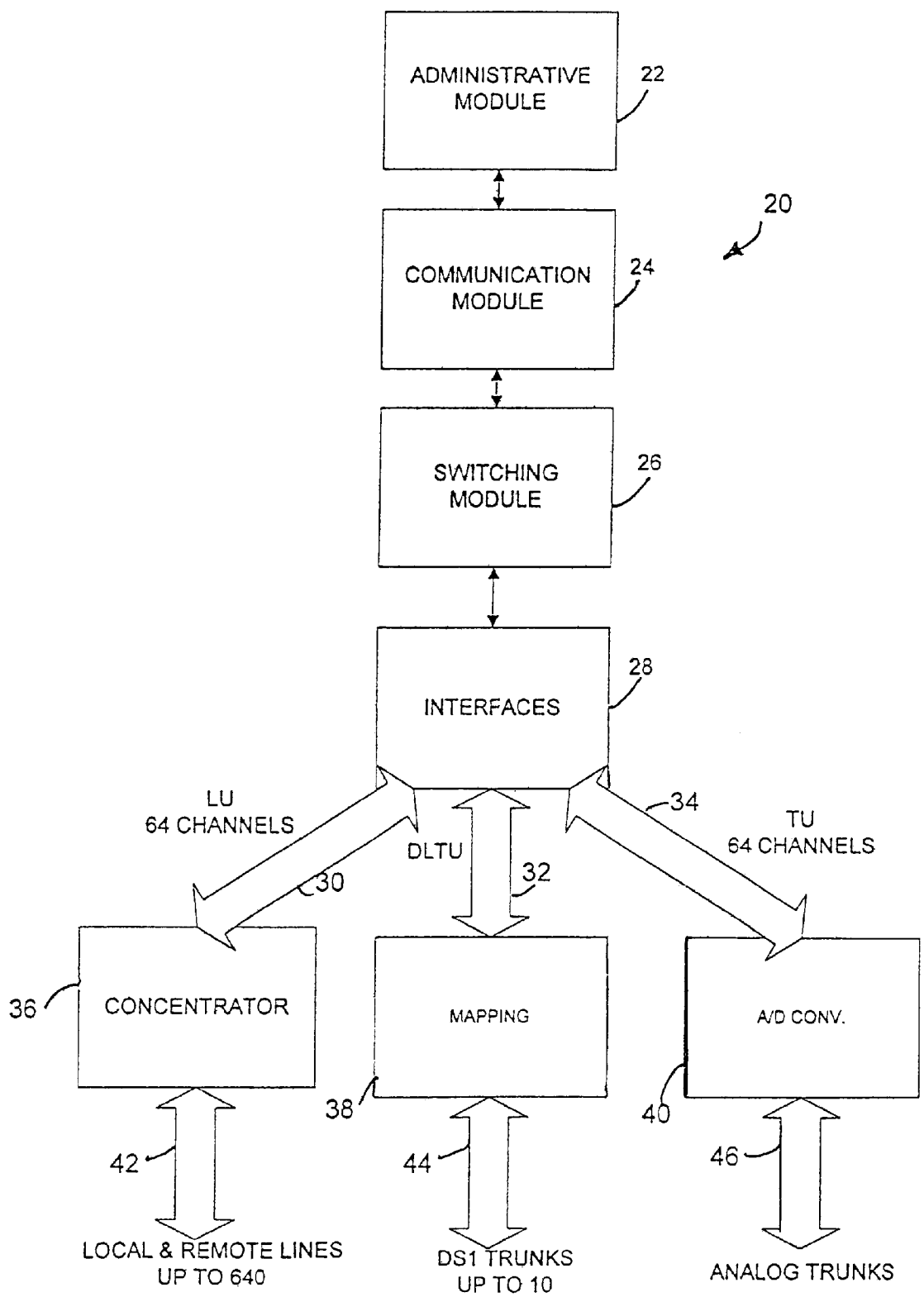
FIG. 3 is a block diagram showing the overall functional structure of an AT&T 5ESS switch.
Figure 4:
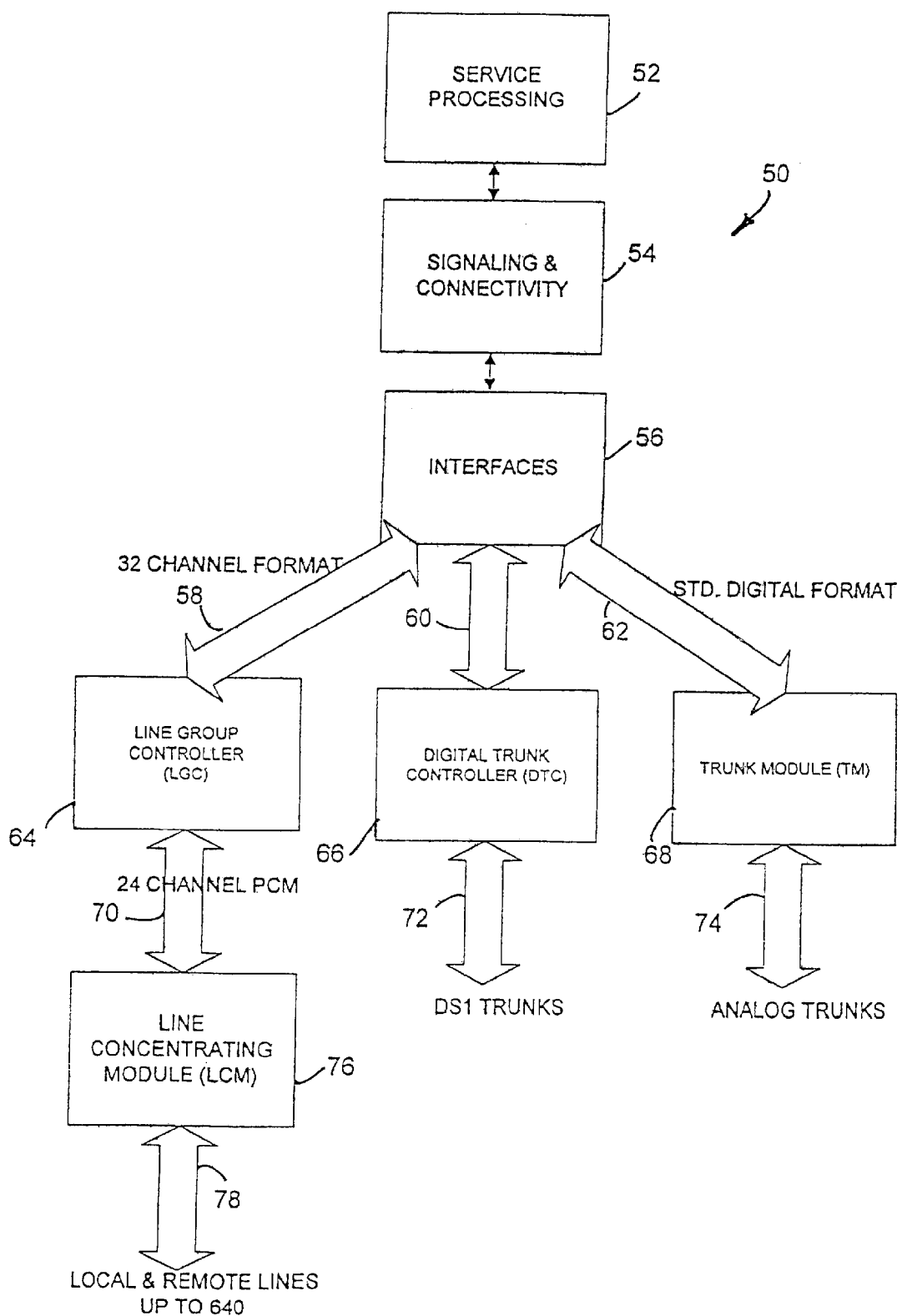
FIG. 4 is a block diagram showing the overall functional structure of a Northern Telecom DMS 100 switch.

Capacity, configuration, use and performance information concerning various network resources can be obtained from digital (and/or analog) telecommunications switches such as the AT&T 5ESS switch 20 and the Nortel DMS 100 switch 50 illustrated in FIGS. 3 and 4, respectively. Switches such as these serve as switching super-nodes which interconnect various types of transmission links forming the network. Accordingly, they either comprise or are in close contact with a majority, if not all, of the key network resources making up the network.

As shown in FIG. 3, a 5ESS switch comprises, among other elements, an administrative module 22, a communication module 24, a switching module 26, and several interface modules 28. Administrative module 22 is provided for purposes of communication with other systems, including NIM systems, data collectors, and a telemanagement system.

Communication module 24 contains the space-switching stage (TMS), and switching module 26 contains time-switching stages (TSI or time-slot interchange). The architecture of the 5ESS switch 20, shown in FIG. 3, is TST, because it passes time slots through the TSI twice.

Interfaces 28 comprise components (not shown) such as data interfaces (DIs) which serve as interfaces to one or more line units (LUs) 30, one or more digital line and trunk units (DLTUs) 32, and one or more trunk units (TUs) 34.

Each LU 30 comprises 64 channels, and each TU 34 comprises 64 channels as well. DLTU 32 provides input/output ports for up to 10 DS1 trunks, and can also interface with E1 trunks.

The various channels of LU 30 are coupled to a concentrator 36 at one side. The other side of concentrator 36 is coupled to a larger number of local and remote lines (up to 640) 42. A mapping module 38 is provided for mapping DLTU 32 to the plurality of DS1 trunks (or E1 trunks) (typically up to 10). A/D converting module 40 couples TU 34 to analog trunks 46.

In FIG. 4, a DMS 100 digital telecommunications switch 50 is provided, which comprises, among other elements, service processing module 52, signaling and conductivity module 54, and interfaces 56. A plurality of peripheral modules (PMs) are coupled to interface 56. A 32 channel format link 58 couples interfaces 56 to a line group controller (LGC) 64. LGC 64 is connected to a line concentrating module (LCM) via a 24 channel PCM link 70. LCM 76 concentrates data into the various channels at 24 PCM link 70 from a larger number of local and remote lines (up to 640) 78. Link 60 is also provided to a digital trunk controller (DTC) 66, which provides a connection to a plurality of DS1 (or other type) trunks 72. A standard digital format link 62 is provided between interfaces 56 and a trunk module (TM) 68, which converts data between the standard digital format 62 and one or more analog trunks 74.

The switches illustrated in FIGS. 3 and 4 are described more fully by Roger L. Freeman in "Telecommunication Engineering," Third Edition, John Wiley & Sons, Inc. (1996). See, inter alia, Chapter 9 and FIGS. 9.10 and 9.11.

Figure 5:
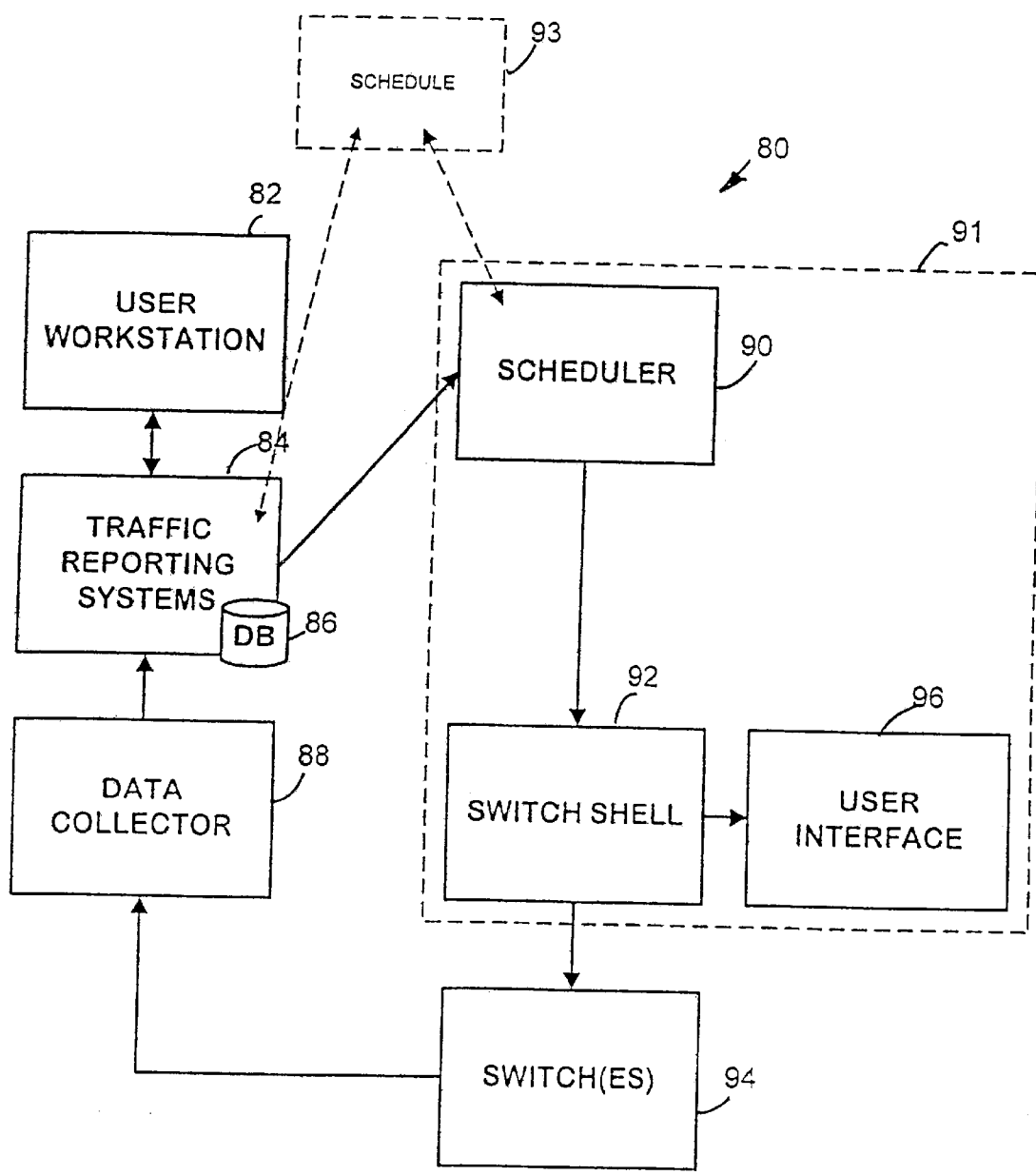
FIG. 5 is a block diagram of an exemplary embodiment of a NIM system of the present invention.

FIG. 5 illustrates a network information management system 80 in accordance with one exemplary embodiment of the present invention. A user work station 82 is connected to (one or more) traffic reporting systems 84, each of which is coupled to a common or respective database 86. A data collector (optional) 88 is shown connected to a switch network 94, and provides operational measurements (OMs) and other traffic-related data to traffic reporting systems 84. A scheduler 90 is coupled to traffic reporting systems 84, and is also coupled to a switch shell 92 which interfaces with each switch via switch network 94. A graphical user interface 96 is connected to switch shell 92.

Traffic reporting systems 84 may comprise a system for ordering, receiving, and reviewing traffic engineering studies pertaining to various grades of service. Such a system may provide the customer with the ability to immediately identify trouble spots, take corrective action, and sell more lines and services.

Telephone switching systems are engineered in accordance with principals based on voice calls with desired average holding times (AHTs). With the advent of the internet, web sites, and customers with personal computers (PCs), traditional methods of engineering networks may no longer be universally applicable. Operators of web sites and customers accessing the Internet with their PCs tend to have very long hold times (HTs). Customers generating long HT calls can cause access problems for other customers if they are concentrated on a limited number of line units or other concentration equipment. The long HT calls may also be causing other problems in the communication network that are not yet fully understood. It would be beneficial if telephone companies could collect data concerning long HT customers to determine where their access points are within the switch architecture. This information can be used to rebalance the line side of the switch to insure optimum service for all users. The data can also be used to conduct fundamental studies to determine what impact the Internet users are having on the switch and to devise strategies for coping with such users. There is a need for an efficient, cost-effective, and accurate method for obtaining more specific and targeted data concerning network resources to help the telephone companies access these issues.

The local and remote customer or subscriber lines which allow customers to access the switch telephone network are not connected directly to the switch. For example, referring to FIG. 4, local and remote lines 78 are not directly connected to DMS 100 switch 50. Instead they are subjected to one or more levels of concentration, e.g., by a line concentrating module (LCM) 76. This switching system is designed with this architecture because local and remote subscriber lines 78 are generally idle most of the time. Thus, it would be inefficient to have a one-to-one correspondence between the channels 70 at one side of LCM 76 and subscriber lines 78 at the other side. The switch only needs to service a particular line when a customer bids for that service. As long as the concentration ratio is within acceptable limits and customer behavior follows normal patterns, all customers may be served.

Switches typically generate traffic measurements on high level concentrators, e.g., those closest to the switching modules on a continuing basis (e.g., at repeated intervals, such as fifteen minute, 30 minutes, 60 minute intervals, etc.). Such traffic measurements may be continuously generated with respect to concentrators 36 of the 5ESS switches and line concentrating modules 76 for DMS 100 switches 50. Even greater detailed measurements on greater detailed concentrators (e.g., half-grids or line group concentrators) and the lines themselves can only be accomplished by means of special studies. A special study allows traffic measurements to be acquired at a greater level of granularity by collecting a predefined set of data on specified resources for a specified period of time. If a special study were run continuously by a switch, the quantity of data would likely exceed the capability of the switch registers or of the data collector connected thereto. For this reason, special studies are usually setup and taken down on an as-needed basis.

To insure that data collection resources are used sufficiently, special studies should only be setup for those network resources for which there is a reason to belief the resulting data is necessary and informative. For example, special studies should be setup on those concentration devices and lines that will reveal high usage customers. This can be accomplished by first analyzing the data on those devices for which data is collected continuously, and then selecting that subset for studies that are most likely to reveal the high usage customers. In prior art systems, the data analysis and setting up special studies was done manually, which involved arduous and time-consuming tasks.

Traffic reporting systems 84 may comprise a subsystem for assisting traffic engineers and planners by identifying "problem" high-usage multi-line hunt group facilities and switch line concentrating devices (e.g., concentrator 36 shown in FIG. 3 and line concentrating module 76 shown in FIG. 4) requiring special studies, so that appropriate actions can be taken to perform correct load-balancing of network resources. This may be accomplished by calculating the call blockage on all line concentrators within a central office. The blockage values are then thresholded, and the line concentrators experiencing high-blockage are selected for more detailed study. Those line concentrators experiencing high-blockage are presumed to be servicing lines with excessive usage. The traffic reporting system may then automatically initiate special studies on all lines serviced by a selected line concentrator.

In addition, or alternatively, the traffic reporting systems 84 may comprise a subsystem for collecting and reporting central office traffic engineering data. The subsystem may automate (through the use of switch interaction modules, including scheduler 90 and switch shell 92), traffic data collection and the calculations needed to analyze the collected data. The subsystem may generate traffic engineering reports on a periodic or on-demand basis and perform studies for specified larger or smaller periods of time as desired. The traffic reporting subsystem may be configured to automatically initiate the report generation process by returning a completed report to the end user once the end of the collection period arrives.

Such a central office engineering traffic reporting subsystem may also collect inventory data concerning network resources to support the analysis of the traffic-related data pertinent to central office engineering. Such inventory data (or reference data) may describe the capacity, routing patterns, and other attributes of the network resources (e.g., number of trunks in a trunk group, number of line units in a switch, and so on). The traffic reporting subsystem may collect such inventory data by inventorying the switch through the use of scheduler 90 and switch shell 92, or by parsing data dumped from switch registers either continuously or through setup studies.

Switch interaction subsystem 91 comprises a scheduler 90, a switch shell 92, and a user interface 96 (e.g., GUI). Switch shell 92 provides a common interface to interact with switches from different vendors, and/or different classes of switches from the same vendor. Scheduler 90 communicates with switch network 94 via switch shell 92, by initiating queries and requesting responses, from among a limited, simplified set of query and response subsets. The respective query and response subsets may include such queries as verify facility, setup facility, takedown facility, inventory a particular facility type, and add or remove an option from a facility. User interface 96 allows a user to manually input such switch interaction commands to switch shell 92. Scheduler 90 utilizes an appropriate API (applications program interface) in order to access this simplified set of commands provided by switch shell 92.

Each switch within switch network 94 (e.g., a 5ESS switch as shown in FIG. 3 or a DMS 100 switch as shown in FIG. 4) has a very specific but large set of switch interaction commands. The command structure for each switch differs dramatically. Switch shell 92 provides a limited language set which greatly simplifies the switch-interaction process, and which makes that process generic to both the scheduler 90 and user interface 96. All details about the switches and the switch command sets remain within switch shell 92, and are remote from the interfaces between switch shell 92 and both scheduler 90 and user interface 96.

When a verify request is made for a particular switch (e.g., a 5ESS switch) for a particular facility name and type (e.g., a uniquely identified trunk group), switch shell 92 will receive that query and scheduler 90 from instantiate a switch interaction object. The switch attributes will be set to be the switch of concern (e.g., the 5ESS), and the switch shell will log-on to that switch. At that point, an object is created called a "switch". This switch object gets filled with pertinent information about that switch.

Then, switch shell 92 performs a verify function for a particular named facility. A facility object is created and instantiated, and the facility attributes are determined and filled into the facility object. The facility attributes may include, among other things, the name (e.g., phone number), and type (e.g., single line unit (SLU) or (MLHG)). More specifically, once a verify facility command is issued to the switch shell, the facility information object is instantiated. That object has information about the facility for the given session. Once the facility object is instantiated and its attributes are defined, there is no longer a need to interact with the switch for purposes of obtaining that information during the same session. Switch shell 92, for subsequent verify requests, simply asks that facility object for the appropriate information (e.g., name, member count, options, overflow).

This switch shell structure facilitates both maintainability and extensibility of the overall NIM.

Figure 6:
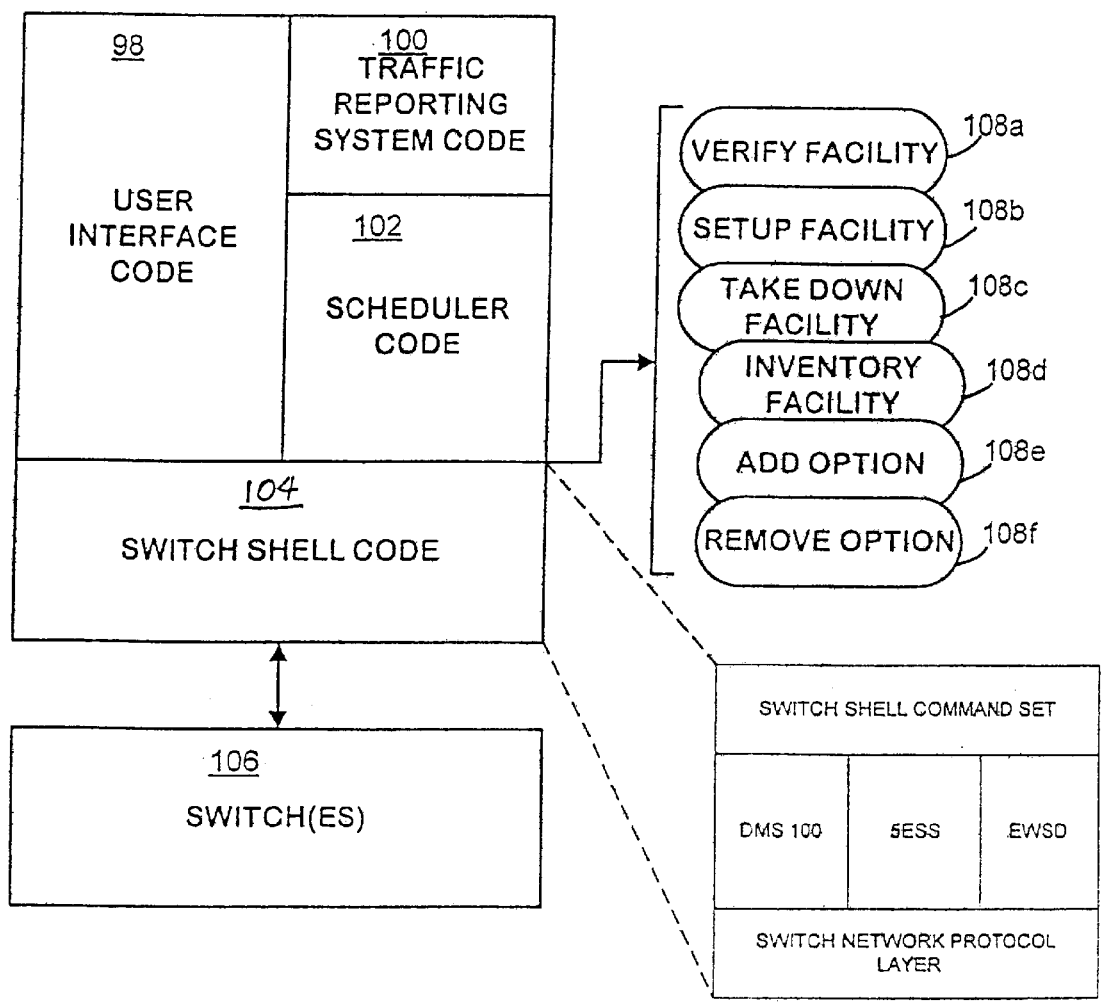
FIG. 6 is a block diagram illustrating the structure of the switch interaction subsystem software used in the NIM system illustrated in FIG. 5.

FIG. 6 further illustrates the various levels of software and interfaces between those levels in the NIM system 80 of FIG. 5. Those software components include user interface code 98 which interfaces directly with switch shell code 104. Traffic reporting system code 100 interacts directly with scheduler code 102 which interacts with switch shell code 104. In the illustrated embodiment, switch shell code 104 exclusively interacts with switches 106 using the appropriate communications protocol for each respective switch.

Switch shell code 104 has one common interface for both user interface code 98 and scheduler code 102. The interface comprises a limited number of high-level generic switch commands 108, which may more specifically comprise a verify facility command 108a, a setup facility command 108b, a takedown facility command 108c, an inventory facility type command 108d, an add option command 108e, and a remove option command 108f.

Verify commands may perform such functions as verifying that the user input data that corresponds to facilities and network information actually on that switch, including, for example, the facility name, the facility type and the switch CLLI. The setup command will cause the study to be scheduled at a time close to the start of the study, and will turn on the data collection. Switch shell 92 of this embodiment completely "divorces" database 86 and traffic supporting systems 84 from the switch interface. Switch shell 92 not only translates between scheduler commands and switch-specific commands, but further facilitates communication with specific network protocols, including DataKit, a specific LAN protocol, or some other mechanism, needed at a lower level to communicate with each switch.

Figure 7:
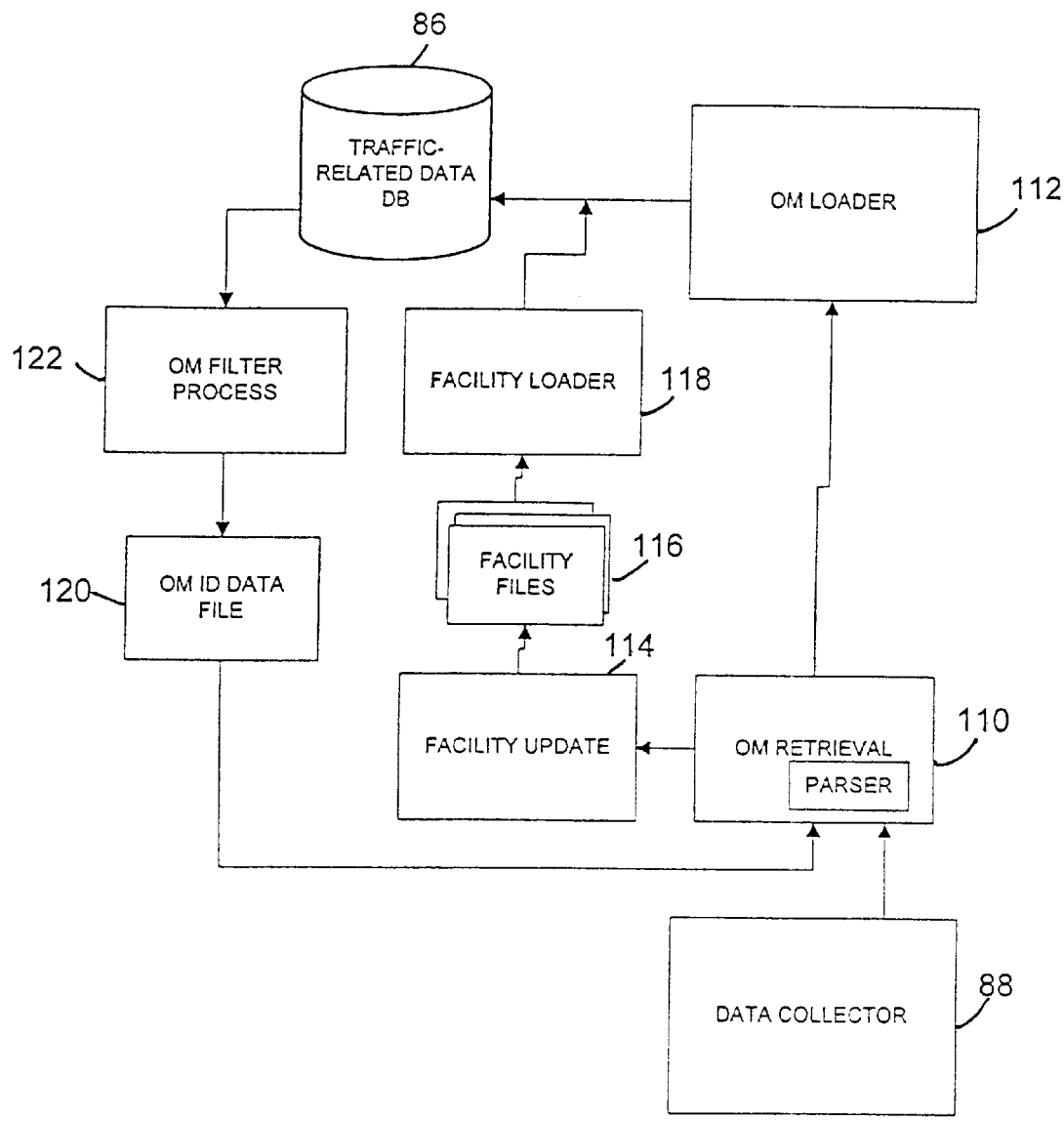
FIG. 7 is a block diagram illustrating the functional components of the NIM system in FIG. 5 pertaining to facility object management and OM retrieval.

FIG. 7 is a block diagram showing the software functional components pertaining to facility object management and OM retrieval. The subsystem illustrated in FIG. 7 facilities the collection of OMs and reference or inventory data concerning network resources. The OMs may comprise facility data which is continuously dumped by the switch to data collector 88, or they may comprise register data specifically setup to be dumped to the data collector 88.

When OM data is dumped, corresponding data concerning the facilities (i.e., network resources) may be provided together with the OM data, and all such information is dumped by the switch to data collector 88. Data collector 88 dumps raw reports to OM retrieval process 110. OM retrieval process 110 converts the raw data it receives from data collector 88 to a common format, and delivers a file to OM loader 112. This delivered file may contain information identifying the network resources pertaining to the OMs, and thus may contain information that will be used to create facility objects concerning those facilities.

OM retrieval process 110 sends facility update information to facility update process 114. Such facility updates may comprise information such as the names of trunks, member counts associated with each network resource (e.g., how many trunks), and so on. The facility update process 114 will then update facility files 116 in accordance with the facility updates it receives from OM retrieval process 110.

Facility loader 118 reads facility files 116, and updates any corresponding facility objects in database 86. In this manner, information concerning network resources (i.e., facilities) is continuously updated.

OM loader 112 loads data concerning collected facilities into database 86 in association with the corresponding facility objects. If no corresponding facility object already exist, and enough information is available in the dumped OM data, OM loader 112 will create such corresponding facility objects and load the data in association therewith. More specifically, OM loader 112 will check, for OMs it receives from OM retrieval process 110, whether a facility object has already been instantiated in connection with database 86. If it has, it will fill in that object with the OMs. If not, OM loader 112 will create a new facility object. This allows the OM collection process to more accurately respond to actual facilities that exist on the network, and eliminates the need to predict which facility objects exists before the OM data is obtained. The precise facility object with which the OM data should be associated can be identified in this manner. A facility object will contain such information as the name of the network resource (e.g., name of the trunk, the directory number of a single line, the directory number of a hunt pilot, and so on).

Certain facility/network resource data, provided in particular registers of the switch, is dumped to data collector 88. Such facility data must be specifically setup as it is not continuously collected on a regular basis. For such setup facility dump register data, data collector 88 dumps raw reports to OM retrieval process 110. An OM filter process 122 will periodically query database 86 in order to obtain a sorted list of active facility objects with corresponding database locations (OM IDs) within database 86. That sorted list of active facility objects with corresponding OM IDs comprises the OM ID data file 120 which will be used by OM retrieval process 110. More specifically, OM retrieval process 110 converts the raw setup facility dump data it receives to a common format and delivers a file to OM loader 112. The conversion performed by OM retrieval process 110 of such data includes filtering and sorting of the data based upon the information provided by OM ID data file 120. OM loader 112 loads the data into database 86.

OM loader 112 transfers operational measurements (OMs), collected from data collector 88 in the form of an ASCII file, and stores the same in database 86. Database 86 comprises one record per OM type. Each such record may contain OMs for different switches and/or for different facility types. A process may be provided that, when run, checks for the existence of this record (which may be a file) in a specified directory. An OM Parser provided as part of the OM retrieval process will execute the OM loader at the appropriate time to load the data into the database.

OM retrieval process 110 may retrieve and parse OMs from different sources depending upon the specific data collector (if any) involved. That is, OMs may be supplied directly by the customer, derived from information supplied by a customer-supplied utility, or captured from information dumped by the switch and retrieved via data collector 88. The parsing that is performed by the OM Parser depends upon the particular type of data collector 88, which may vary.

Figure 8:
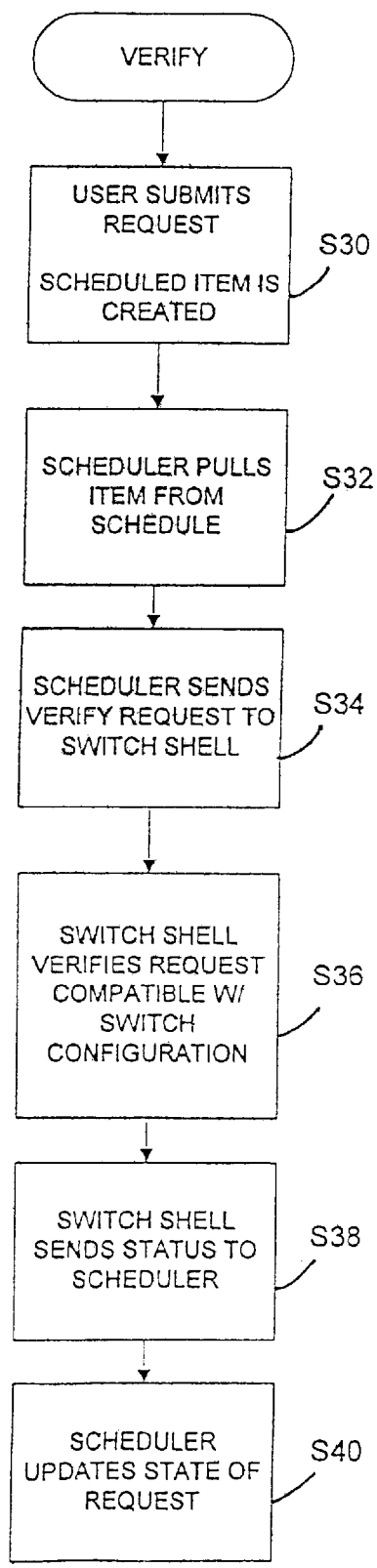
FIG. 8 is a flow diagram generally illustrating the process performed by the switch interaction subsystem to verify a facility on a switch.

FIG. 8 is a flow diagram generally illustrating the process of verifying a facility on a switch. When a switch is verified for a particular study, the system verifies that the study is compatible with the designated facility and switch. During verification, the system determines whether there are sufficient switch resources available for a collection process to begin. It is possible that a single data collection request will have multiple facilities associated with it. Should this occur, the verification process will take place for each facility. The verification process may be run periodically or on-demand, and automatically reschedule any facility studies for which verification has not been obtained. During re-verification, the process will attempt to verify only the facilities that have not already been verified. Once verified, the corresponding request status will be changed accordingly. Re-verification attempts may continue for all requested facilities until terminated by an operator, a time out, another process, or an error is detected.

At step S30, a user will submit a request for a study at user workstation 82. If the switch has already been verified, the schedule 93 will be updated, and the verify process will skip over to step S40. If it has not been verified, traffic reporting system 84 will create a scheduled item and place that item on a schedule 93 which may form part of traffic reporting system 84 or scheduler 90. Thereafter, at step S32, scheduler 90 will pull the item from schedule 93 and, at step S34, send a verify request to switch shell 92. At step S36, switch shell 92 will verify that the request is compatible with the switch configuration by interacting with the switch via switch network 94.

Later, in step S38, switch shell 92 will send a status to scheduler 90, and in step S40, scheduler 90 will update the state of the request.

Figure 9:
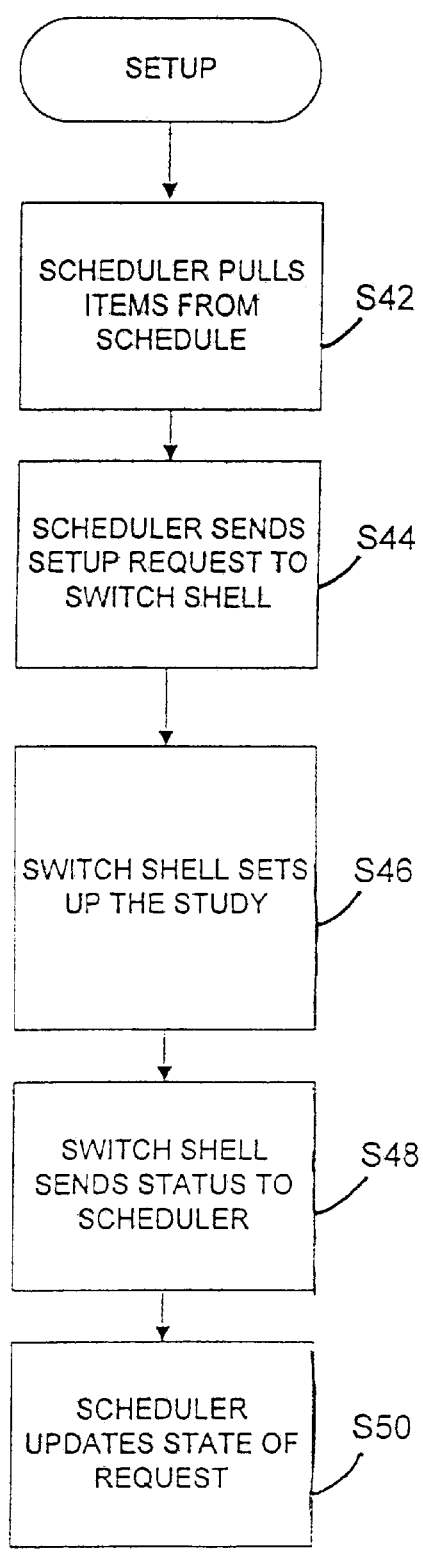
FIG. 9 is a flow diagram generally illustrating the process of a switch interaction subsystem performed to setup a facility on a switch.

FIG. 9 is a flow diagram generally illustrating the process of setting up a facility on a switch, by which data collection is provisioned and turned on when necessary for a particular facility. At step S42, scheduler 90 pulls certain scheduled items (created in step S40) from the schedule 93. In step S44, scheduler 90 sends a setup request to switch shell 92. In response to the received setup request, switch shell 92 will interact with the switch to setup the study. In step S48, switch shell 92 will send a status to scheduler 90. In step S50, scheduler 90 will update the state of the request in schedule 93.

Figure 10:
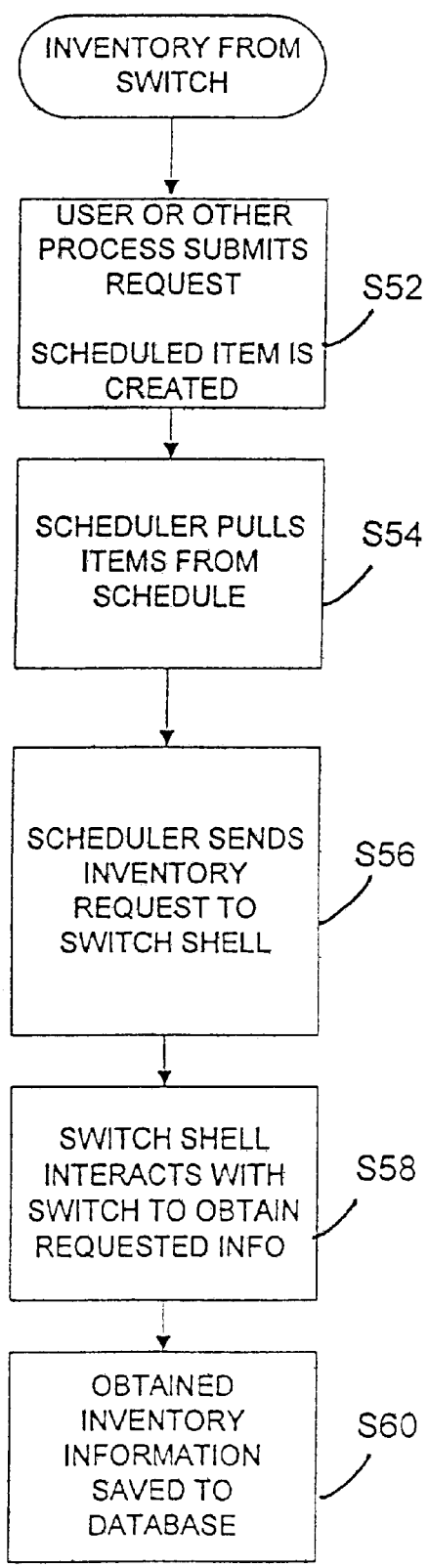
FIG. 10 is a flow diagram generally illustrating the process performed by the switch interaction subsystem to inventory a switch.

FIG. 10 is a flow diagram generally illustrating the process of inventorying a switch. In inventorying a switch, database 86 will be synchronized to represent interested network resources, and switch shell 92 will interact with the switch to obtain information concerning those resources, including, for example, network resource identifying information (e.g., the name of a trunk, the directory number of a single line, or the directory number of a hunt pilot), the number of members within that network resource, whether or not the network resource is physically there, whether the network resource is hardware assigned, and whether the network resource is software assigned).

At step S52, the user at user work station 82 (or another process) will submit a request for an inventory, and a scheduled item will be created in the schedule. In step S54, scheduler 90 will pull the appropriate items from the schedule. In step S56, scheduler 90 will send an inventory request to switch shell 92. In step S58, switch shell 92, in response to the inventory request, will interact with the switch to obtain the requested information. Depending upon the switch type, the switch connectivity and the extent to which there is a desire to minimize the time connected to the switch, step S58 may be modified. For example, a request may be sent to the switch to begin the inventory process, and then in a subsequent step, after some predetermined amount of time has elapsed, the requested inventory information may be retrieved from the switch.

At step S60, the obtained inventory information is saved to database 86.

Figure 11:
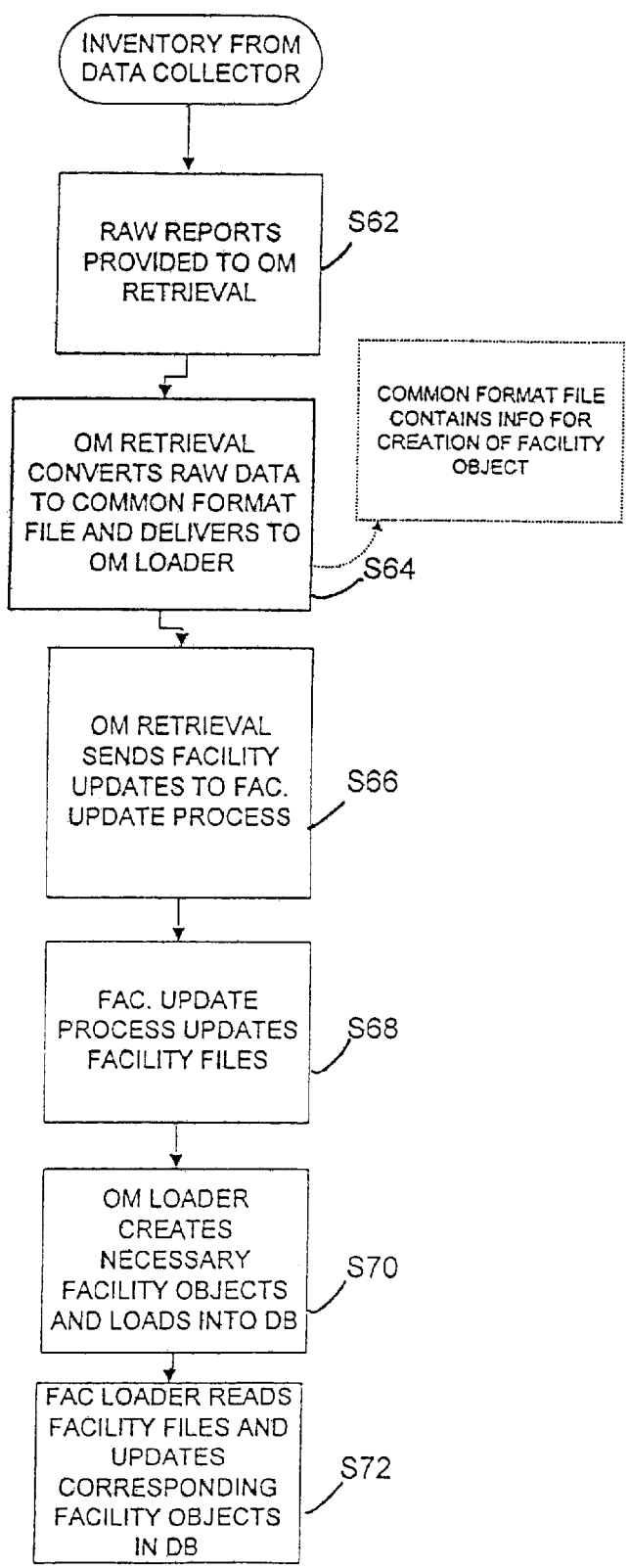
FIG. 11 is a flow diagram generally illustrating the process performed by the switch interaction subsystem to obtain inventory information from a data collector or directly from the switch.

FIG. 11 is a flow diagram generally illustrating the process of obtaining inventory information from the data collector (or directly from the switch, in the event there is no data collector). This process will be described with reference to the various software components illustrated in FIG. 7. In step S62, raw reports are provided by data collector 88 to an OM retrieval process 110. Thereafter, in step S64, OM retrieval process 110 converts the raw data to a common format file and delivers that file to OM loader 112. The common format file contains information for the creation of a facility object, if necessary, by OM loader 112, so that the inventory information pertaining to the network resource can be stored in association with that object.

At step S66, OM retrieval process 110 sends facility updates to a facility update process 114. At step S68, facility update process 114 updates facility files 116. At step S70, OM loader 112 creates the necessary facility objects, and loads the OM data into database 86 in association with the appropriate facility object. At step S72, facility loader 118 reads a facility file 116, and updates the corresponding facility objects in database 86.

Figure 12:
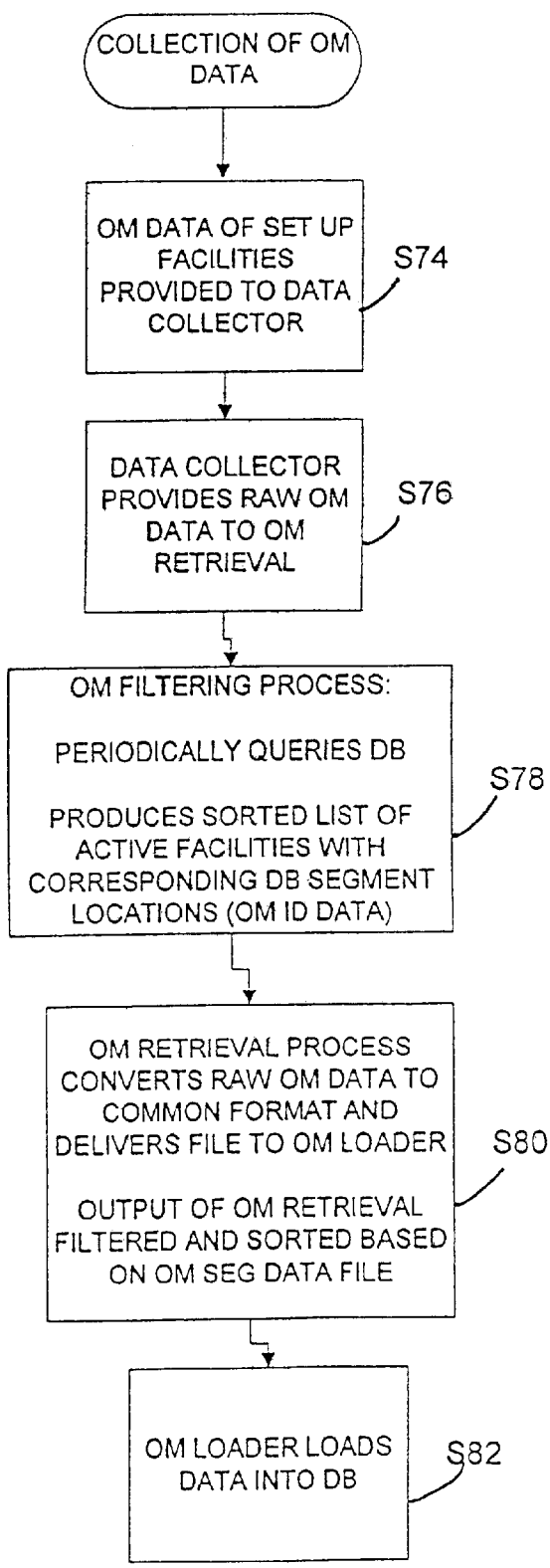
FIG. 12 is a flow diagram generally illustrating the process performed by the NIM system to collect OM data.

FIG. 12 is a flow diagram generally illustrating the process of collecting OM data which may include continuously dumped data (traffic management data) and OM data which is not continuously dumped data (i.e., OM data setup to be gathered in certain switch registers and dumped by the switch at preset intervals—i.e., setup facility dump register data). At step S74, the collected OM data is provided by the switch to data collector 88. At step S76, data collector 88 provides raw OM data to OM retrieval process 110. At step S78, an OM segment process 122 periodically queries database 86, and produces a sorted list of active facilities with corresponding OM IDs. That sorted list comprises OM segment data 120.

At step S80, OM retrieval process 110 converts raw OM data which it receives from data collector 88 to a common format and delivers the common format file to OM loader 112. The output of OM retrieval process 110 is filtered and sorted to create the common format file based upon OM segment data file 120.

At step S82, OM loader 112 loads the common format data into database 86 in association with the appropriate corresponding facility objects.

Figure 13:
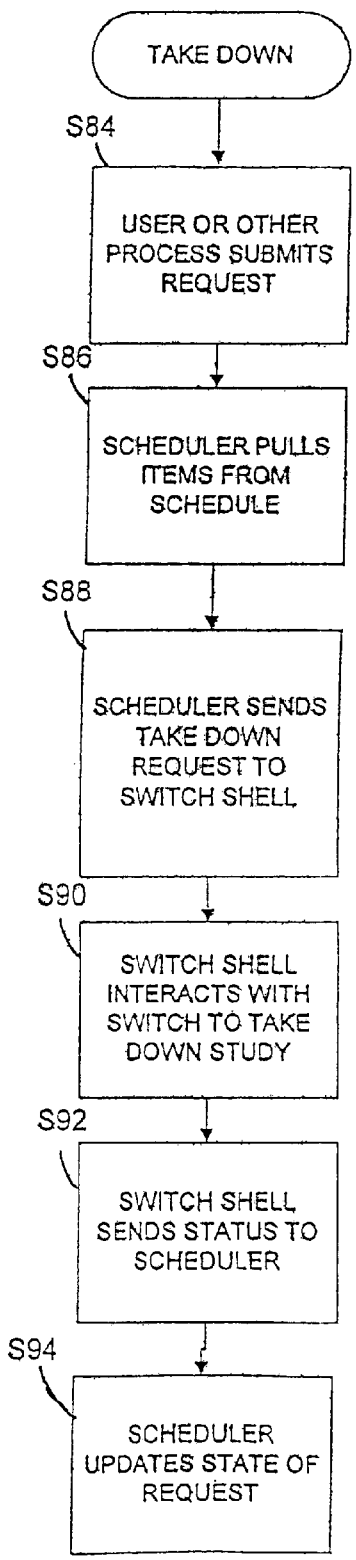
FIG. 13 is a flow diagram generally illustrating the process performed by the switch interaction subsystem to take down a traffic study.

FIG. 13 is a flow diagram generally illustrating the process of taking down a special study on a switch. This process will be described in reference to the NIM components shown in FIG. 5. At step S84, a user or another process will submit a request. Scheduler 90 will pull the appropriate items from schedule 93 at step S86. At step S88, scheduler 90 will send a take down request to switch shell 92. At step S90, switch shell 92 will interact with the switch to take down the study. Thereafter, at step S92, switch shell 92 will send a status concerning the take down request to scheduler 90. At step S94, scheduler 92 will update the state of the request.

While the invention has been described by way of exemplary embodiments, it is understood that the words that have been used herein are the words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equivalent structure, means, and usages which are within the scope of the appended claims.

What is claimed is:

1. A network information management system, comprising:
   a traffic reporting system comprising a database holding traffic-related data collected from a digital telecommunications network switch;
   a switch shell comprising a higher layer generic interface protocol defining common switch interaction functions with a set of query and response subsets, said common switch interaction functions being common among multiple switch types, a middle layer comprising respective code portions uniquely compatible with communications protocols of corresponding ones of said multiple switch types, and a lower layer for interfacing said switch shell with a local area network linking plural digital telecommunications switches; and
   a scheduling mechanism scheduling switch interactions between said traffic reporting system and said switch shell;
   said query and response subsets comprising a query and response subset for submitting inventory requests to said switch and for receiving, in response to said submitted inventory requests, inventory information from said switch, said inventory information comprising a unique identifier of a network resource, and a number of members provided as part of said network resource.

2. The network information management system according to claim 1, wherein said inventory information further comprises information indicating whether each member of said network resource is at least one of hardware assigned and software assigned.

3. The network information management system according to claim 1, wherein said multiple switch types comprise 5ESS and DMS 100 switches.

4. The network information management system according to claim 1, wherein said multiple switch types comprise EWSD switches.

5. The network information management system according to claim 1, wherein said network resource comprises a concentrator comprising first and second sides, a first number of channels being received at said first side and a second number of lines being received at said second side, said second number being substantially greater then said first number.

6. The network information management system according to claim 5, wherein said concentrator comprises a line concentrating module of a DMS 100 switch.

7. The network information management system according to claim 5, wherein said concentrator comprises a concentrator of a 5ESS switch, receiving 64 channels at said first side, and receiving up to 640 lines at said second side.

8. A network information management system, comprising:
   a traffic reporting system comprising a database holding traffic-related data collected from a digital telecommunications network switch;
   a switch shell comprising a higher layer generic interface protocol defining common switch interaction functions with a set of query and response subsets, said common switch interaction functions being common among multiple switch types, a middle layer comprising respective code portions uniquely compatible with communications protocols of corresponding ones of said multiple switch types, and a lower layer for interfacing said switch shell with a local area network linking plural telecommunications switches; and
   a scheduling mechanism scheduling switch interactions between said traffic reporting system and said switch shell;
   said query and response subsets comprising a query and response subset for submitting setup requests to said switch to set up particular traffic studies, the setting up of a particular traffic study comprising assigning a set of registers within said switch to accumulate data concerning a network resource associated with said switch, said switch accumulating in said assigned set of registers operational measurements (OMs) and associated inventory information including a unique identifier of said network resource, a number of members provided as part of said network resource, and information indicating whether each member of said network resource is at least one of hardware assigned and software assigned;
   an OM retrieval process for retrieving said accumulated OMs and inventory information from said assigned set of registers;
   a facility update process for updating facility files comprising inventory information pertaining to said network resource; and
   a facility loader using network inventory information in said facility files to modify network resource information held by said database.

9. A switch interaction subsystem comprising:
   a switch shell comprising a higher layer generic interface protocol defining common switch interaction functions with a set of query and response subsets, said common switch interaction functions being common among multiple switch types, a middle layer comprising respective code portions uniquely compatible with communications protocols of corresponding ones of said multiple switch types, and a lower layer for interfacing said switch shell with a local area network linking plural telecommunications switches; and
   a scheduling mechanism scheduling switch interactions between a traffic reporting system and said switch shell.

10. The switch interaction subsystem according to claim 9, wherein said query and response subsets comprise a query and response subset for submitting inventory requests to said switch and for receiving inventory information from said switch in response to said inventory request, said inventory information comprising a unique identifier of a network resource, a number of members provided as part of said network resource, and information indicating whether each member of said network resource is at least one of hardware assigned and software assigned.

* * * * *